(12) United States Patent
Tochigi et al.

(10) Patent No.: US 9,742,218 B2
(45) Date of Patent: Aug. 22, 2017

(54) CHARGING CONTROL DEVICE, CHARGING CONTROL METHOD, COMPUTER PROGRAM, AND RECORDING MEDIUM

(71) Applicant: TOYOTA JIDOSHA KABUSHIKI KAISHA, Toyota-shi, Aichi-ken (JP)

(72) Inventors: Kohei Tochigi, Susono (JP); Koji Ito, Nagoya (JP); Michihiro Miyashita, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 153 days.

(21) Appl. No.: 14/649,381

(22) PCT Filed: Dec. 4, 2012

(86) PCT No.: PCT/JP2012/007763
§ 371 (c)(1),
(2) Date: Jun. 3, 2015

(87) PCT Pub. No.: WO2014/087450
PCT Pub. Date: Jun. 12, 2014

(65) Prior Publication Data
US 2015/0349581 A1 Dec. 3, 2015

(51) Int. Cl.
*H02J 7/00* (2006.01)
*B60L 11/02* (2006.01)
(Continued)

(52) U.S. Cl.
CPC ............... *H02J 7/14* (2013.01); *H01M 10/44* (2013.01); *H01M 10/48* (2013.01);
(Continued)

(58) Field of Classification Search
CPC .......... B60L 11/14; H02J 7/14; H02J 7/0057; H01M 10/44; H01M 10/48
(Continued)

(56) References Cited

U.S. PATENT DOCUMENTS

2009/0295399 A1* 12/2009 Ueda ................... B60L 11/1859
324/429
2010/0070121 A1* 3/2010 Ochiai ..................... B60K 6/48
701/22
(Continued)

FOREIGN PATENT DOCUMENTS

JP 2004-328906 A 11/2004

*Primary Examiner* — M'baye Diao
(74) *Attorney, Agent, or Firm* — Sughrue Mion, PLLC

(57) ABSTRACT

A charging control unit is used in a system having an engine, an electric power generator, and a battery charged by electric power generated by the electric power generator and being capable of executing stop control for prohibiting the engine from restarting in a state where the engine is stopped. The charging control device is provided with a charging and discharging rate calculation unit calculating a charging and discharging rate, the charging and discharging rate being the ratio of the absolute value of a charging current integrated value of the battery to the absolute value of a discharging current integrated value of the battery following the full charging of the battery, a pre-charging execution unit allowing the execution of the stop control, charging the battery by the electric power generated by the electric power generator, and executing pre-charging for increasing the average remaining capacity of the battery, the pre-charging execution unit shortening a period during which the pre-charging is executed when the calculated charging and discharging rate is high, and a refresh charging execution unit executing refresh charging for charging the battery by the electric power generated by the electric power generator, without (Continued)

executing the stop control, after the execution of the precharging and allowing the battery to be fully charged.

7 Claims, 11 Drawing Sheets

(51) Int. Cl.
*B60W 10/26* (2006.01)
*H02J 7/14* (2006.01)
*H01M 10/44* (2006.01)
*H01M 10/48* (2006.01)

(52) U.S. Cl.
CPC .......... *H02J 7/0057* (2013.01); *H02J 7/1492* (2013.01); *H01M 2220/20* (2013.01); *Y02T 10/92* (2013.01)

(58) Field of Classification Search
USPC .......................... 320/109; 701/22; 180/65.29
See application file for complete search history.

(56) References Cited

U.S. PATENT DOCUMENTS

2010/0217484 A1* 8/2010 Mizuno ............... F02N 11/0818
 701/36
2014/0316628 A1* 10/2014 Miyashita ........... B60R 16/0236
 701/22

* cited by examiner

FIG. 7
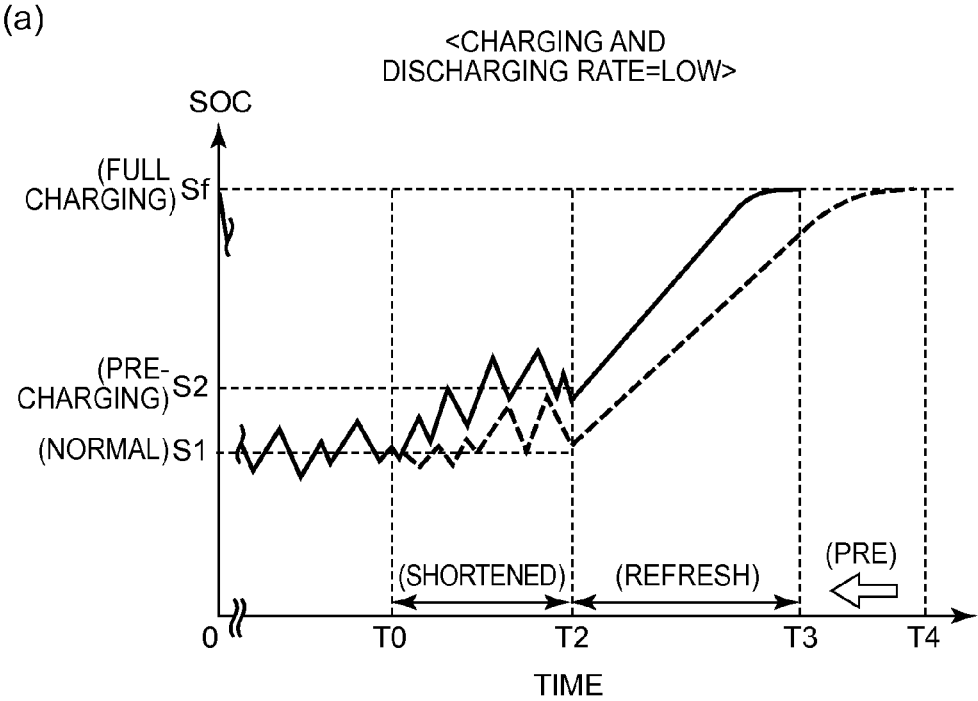
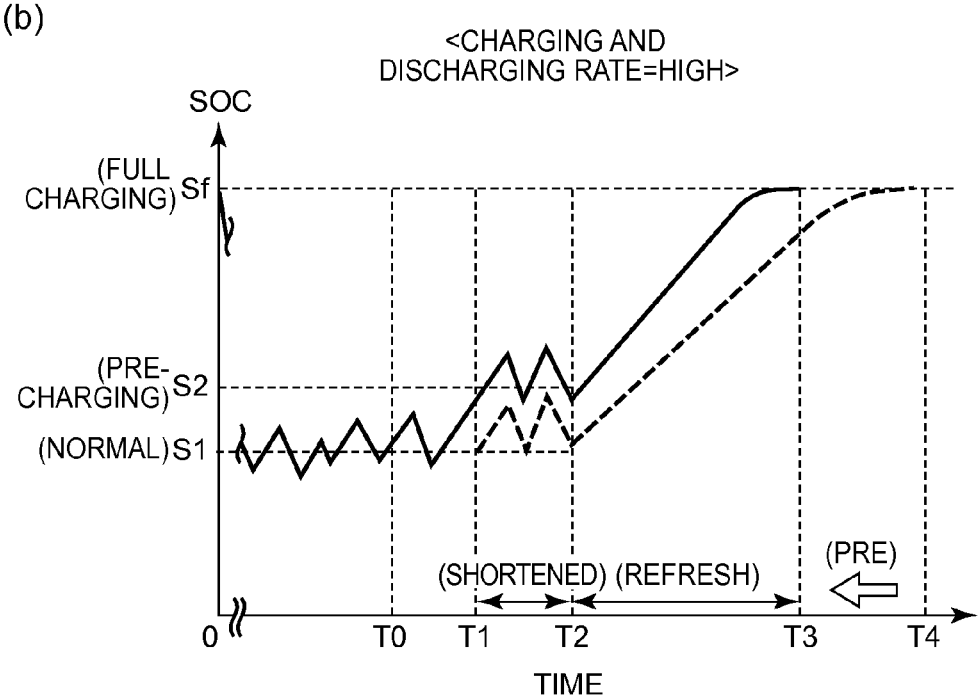

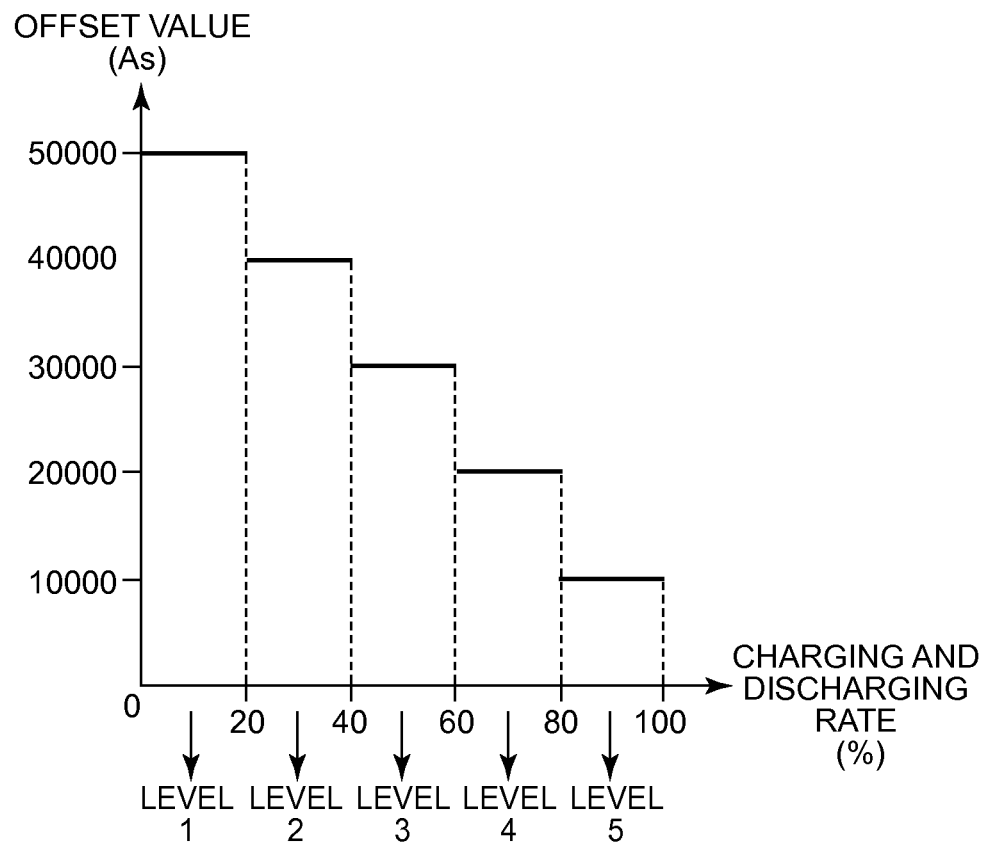

CHARGING CONTROL DEVICE, CHARGING CONTROL METHOD, COMPUTER PROGRAM, AND RECORDING MEDIUM

TECHNICAL FIELD

The invention relates to controlling the charging of a battery using an electric power generator.

BACKGROUND ART

In order to suppress reduction in the performance and service life of a battery that is attributable to repeated charging and discharging with no full charging in a vehicle such as a battery-mounted car, refresh charging is performed in a case where, for example, the elapsed time from full charging becomes equal to or longer than predetermined time. The refresh charging is, for example, realized by allowing an engine operation to continue with the upper limit voltage during the charging being set to be higher than usual. When the refresh charging is executed in a vehicle in which idle reduction control (also called start and stop control) for stopping the engine in a case where the vehicle speed becomes equal to or less than a predetermined value can be executed, the engine cannot be stopped even in a case where an engine stop condition is satisfied, and thus fuel economy may be reduced. A method for performing the pre-charging prior to the execution of the refresh charging to increase the state of charge (SOC) of the battery and shortening the refresh charging period has been suggested (Patent Literature 1). The execution of the idle reduction control is allowed during this pre-charging.

CITATION LIST

Patent Literature

Patent Literature 1: Japanese Patent Application Publication No. 2004-328906

SUMMARY OF THE INVENTION

Technical Problem

According to the technique for executing the pre-charging in advance prior to the execution of the refresh charging, a high-SOC state continues over a long period of time when the period from the pre-charging initiation to the refresh charging initiation is long. In the vehicle, an electric power generator is driven by the engine and electric power generated by the electric power generator is supplied to the battery so that the battery is charged. However, in a battery in a high-SOC state, the additionally acceptable electric capacity is small, and thus the electric power generated by the electric power generator is not used to charge the battery, which results in fuel economy deterioration.

The above-described problems are not limited to the vehicle but may arise in any system that has an engine, an electric power generator, and a battery and is capable of performing control for prohibiting the engine from starting in a state where the engine is stopped. In the system, a compact size, cost reduction, less resource consumption, the ease of manufacturing, usability improvement, and the like are desired along with solutions to the problems.

Solution to Problem

The invention has been made to address at least some of the above-described problems and can be realized in the following forms.

(1) According to an aspect of the invention, there is provided a charging control device used in a system having an engine, an electric power generator driven by the engine, and a battery charged by electric power generated by the electric power generator and being capable of executing stop control for prohibiting the engine from restarting in a state where the engine is stopped and controlling the charging of the battery. The charging control device is provided with a charging and discharging rate calculation unit calculating a charging and discharging rate, the charging and discharging rate being the ratio of the absolute value of a charging current integrated value of the battery to the absolute value of a discharging current integrated value of the battery following the full charging of the battery, a pre-charging execution unit executing pre-charging for increasing the average remaining capacity of the battery, the pre-charging execution unit shortening a period during which the pre-charging is executed when the calculated charging and discharging rate is high, and a refresh charging execution unit executing refresh charging for charging the battery by the electric power generated by the electric power generator, without executing the stop control, after the execution of the pre-charging and allowing the battery to be fully charged. According to this charging control device, the pre-charging is executed over a short period of time when the charging and discharging rate is high, and thus a period during which a state where the average remaining capacity of the battery is high continues can be shortened. Accordingly, a large electric capacity can be ensured to be capable of accepting the electric power generated by the electric power generator in the battery and fuel economy can be improved compared to a configuration in which the pre-charging period is constant regardless of the charging and discharging rate. In addition, since the pre-charging is performed prior to the refresh charging and the average remaining capacity of the battery is increased, the period required for the refresh charging can be shortened. Accordingly, a period during which the stop control is prohibited as a result of the execution of the refresh charging can be shortened and fuel economy can be improved.

(2) The charging control device according to the above-described aspect may further include an elapsed time measuring unit measuring the time elapsed from the full charging of the battery by the refresh charging, the refresh charging execution unit may execute the refresh charging in a case where the elapsed time becomes equal to a predetermined first threshold time, and the pre-charging execution unit may delay the time at which the pre-charging is initiated, compared to a case where the calculated charging and discharging rate is low, when the calculated charging and discharging rate is high after the full charging of the battery by the refresh charging. According to this charging control device, the pre-charging can be executed over a short period of time when the charging and discharging rate is high. In addition, since the initiation timings of the pre-charging and the refresh charging are determined based on the time elapsed from the full charging of the battery, the battery can be charged at appropriate timing in accordance with the deterioration of the battery.

(3) The charging control device according to the above-described aspect may further include a threshold setting unit, the pre-charging execution unit may execute the pre-charging in a case where the elapsed time becomes equal to second threshold time shorter than the first threshold time, and the threshold setting unit may set the second threshold time to a long value, compared to a case where the calculated charging and discharging rate is low, when the calculated charging and discharging rate is high. According to this charging control device, the time at which the pre-charging is initiated can be delayed when the discharging rate is high.

(4) The charging control device according to the above-described aspect may further include a current integrated value calculation unit obtaining a total current integrated value of the absolute value of the charging current integrated value and the absolute value of the discharging current integrated value following the full charging of the battery by the refresh charging, and a threshold setting unit, the refresh charging execution unit may execute the refresh charging in a case where the total current integrated value becomes equal to a predetermined first threshold integrated value, the pre-charging execution unit may execute the pre-charging in a case where the total current integrated value becomes equal to a second threshold integrated value less than the first threshold integrated value, and the threshold setting unit may set the second threshold integrated value to a high value, compared to a case where the calculated charging and discharging rate is low, when the calculated charging and discharging rate is high. According to this charging control device, the pre-charging can be executed over a short period of time when the charging and discharging rate is high. In this charging control device, the refresh charging is executed in a case where the total current integrated value becomes equal to a predetermined first threshold integrated value and the second threshold integrated value is set to a high value when the charging and discharging rate is high, and thus the difference between the first threshold integrated value and the second threshold integrated value decreases as the charging and discharging rate increases. In general, the period of the charging or discharging of the battery increases as the elapsed time increases, and thus the total current integrated value increases. Accordingly, the period during which the pre-charging is executed is shortened as the difference between the first threshold integrated value and the second threshold integrated value decreases.

(5) In the charging control device described above, the system may be mounted on a vehicle using the engine as a power source, the stop control may be idle reduction control, and the state where the engine is stopped may be a state where the speed at which the vehicle moves is equal to or less than a predetermined speed. According to this charging control device, the fuel economy of the vehicle in which the idle reduction control is executed can be improved.

The invention can be realized in various forms, examples of which include a system provided with a charging control device, a vehicle on which the system is mounted, a battery charging control method, a battery charging control system, a vehicle control method, a computer program for realizing these control methods, and a non-temporary recording medium in which the computer program is recorded.

BRIEF DESCRIPTION OF THE DRAWINGS

FIG. 7 is a timing chart illustrating how an SOC changes in a case where the charging control processing and the threshold time adjustment processing according to the first embodiment are executed.

FIG. 11 is an explanatory drawing schematically illustrating the setting content of the threshold determination map that is illustrated in FIG. 8.

MODES FOR CARRYING OUT THE INVENTION

A. First Embodiment

A1. Device Configuration

Figure 1:
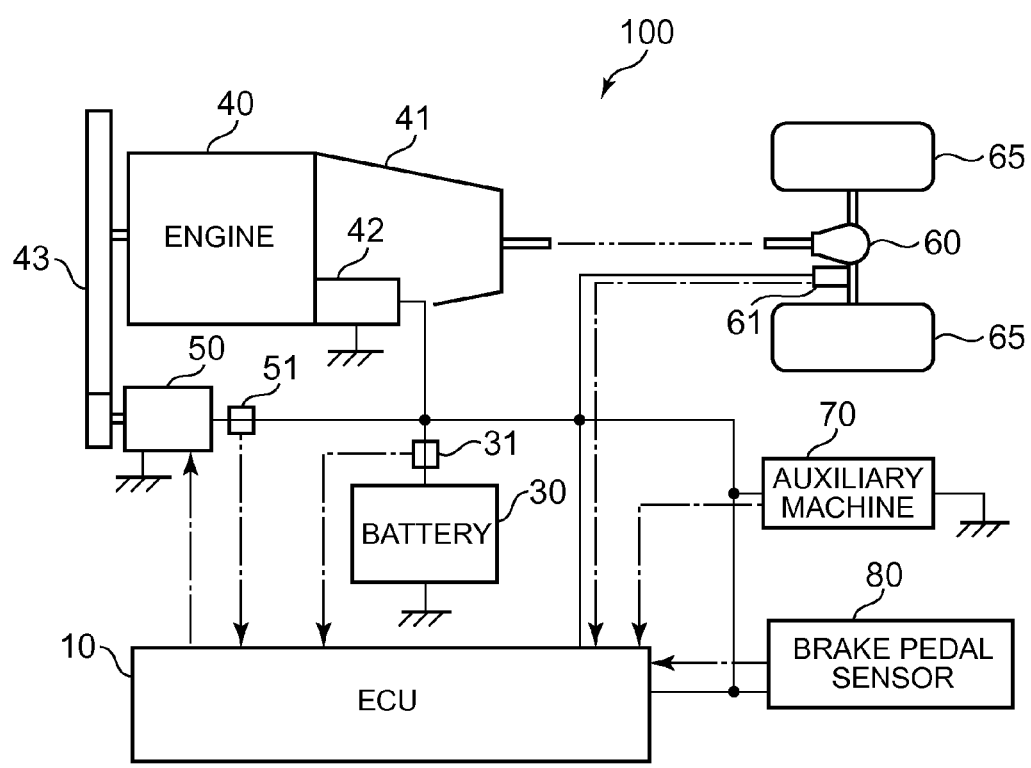
FIG. 1 is an explanatory drawing illustrating the configuration of a system on which a charging control device according to an embodiment of the invention is mounted.

FIG. 1 is an explanatory drawing illustrating the configuration of a system on which a charging control device according to an embodiment of the invention is mounted. The system 100, which is mounted on a vehicle, can execute idle reduction control (also called start and stop control) for prohibiting an engine operation when the vehicle is stopped. In addition, the system 100 can execute charging control for a mounted battery. The system 100 is provided with an engine 40, a transmission 41, drive wheels 65, a differential gear 60, a starter 42, a drive mechanism 43, an alternator 50, a battery 30, an auxiliary machine 70, a battery current sensor 31, an alternator current sensor 51, a vehicle speed sensor 61, a brake pedal sensor 80, and an electronic control unit (ECU) 10. In this embodiment, the vehicle is a car.

The engine 40 is an internal combustion engine that generates power by burning a fuel such as gasoline and diesel. The output of the engine 40 is controlled by the electronic control unit 10 in accordance with the depression amount of an accelerator pedal (not illustrated) that is operated by an operator.

The transmission 41 executes gear shift ratio change (so-called shift change). The power (number of revolutions) of the engine 40 is shifted by the transmission 41 and is transmitted to both of the right and left drive wheels 65 via the differential gear 60 as a desired number of revolutions and torque. The acceleration and deceleration of the vehicle are performed as the power of the engine 40 is transmitted to the drive wheels 65 via the transmission 41 while being changed in accordance with the depression amount of the accelerator pedal as described above.

The starter 42 is a starter motor that starts the engine 40 by using the electric power that is supplied from the battery 30. Normally, the engine 40 is started by the starter 42 when an ignition switch (not illustrated) is turned ON by the operator during the initiation of an operation of the stopping vehicle. In this example, an "idle reduction state" means a state where the engine 40 is stopped by the idle reduction control.

The drive mechanism 43 transmits the power of the engine 40 to the alternator 50. A belt drive, for example, can be adopted as the drive mechanism 43.

The alternator 50 performs electric power generation (hereinafter, referred to as "fuel electric power generation") by using the power of the engine 40 that is transmitted via the drive mechanism 43. The electric power that is generated by the electric power generation is used to charge the battery 30 via an inverter (not illustrated).

The battery 30 is a lead storage battery as a DC electric power supply with a voltage of 12 V and supplies electric power to the auxiliary machine 70 in addition to the starter 42. Other types of batteries such as a lithium-ion storage battery and a rocking chair-type accumulator can be adopted instead of the lead storage battery.

The auxiliary machine 70 is a peripheral device that is operated by using the electric power which is supplied from the battery 30. Examples of the auxiliary machine 70 include a lighting system device including a head lamp and a tail lamp, a wiper, an air-conditioning device, and an electric fan for a radiator.

The battery current sensor 31 detects the charging and discharging currents of the battery 30. The alternator current sensor 51 detects the output current of the alternator 50. The vehicle speed sensor 61 detects the rotation speed of the drive wheels 65. The brake pedal sensor 80 detects the presence or absence of a predetermined depression amount in a brake pedal (not illustrated). Each of these sensors 31, 51, 61, 80 is electrically connected to the electronic control unit 10.

Figure 2:
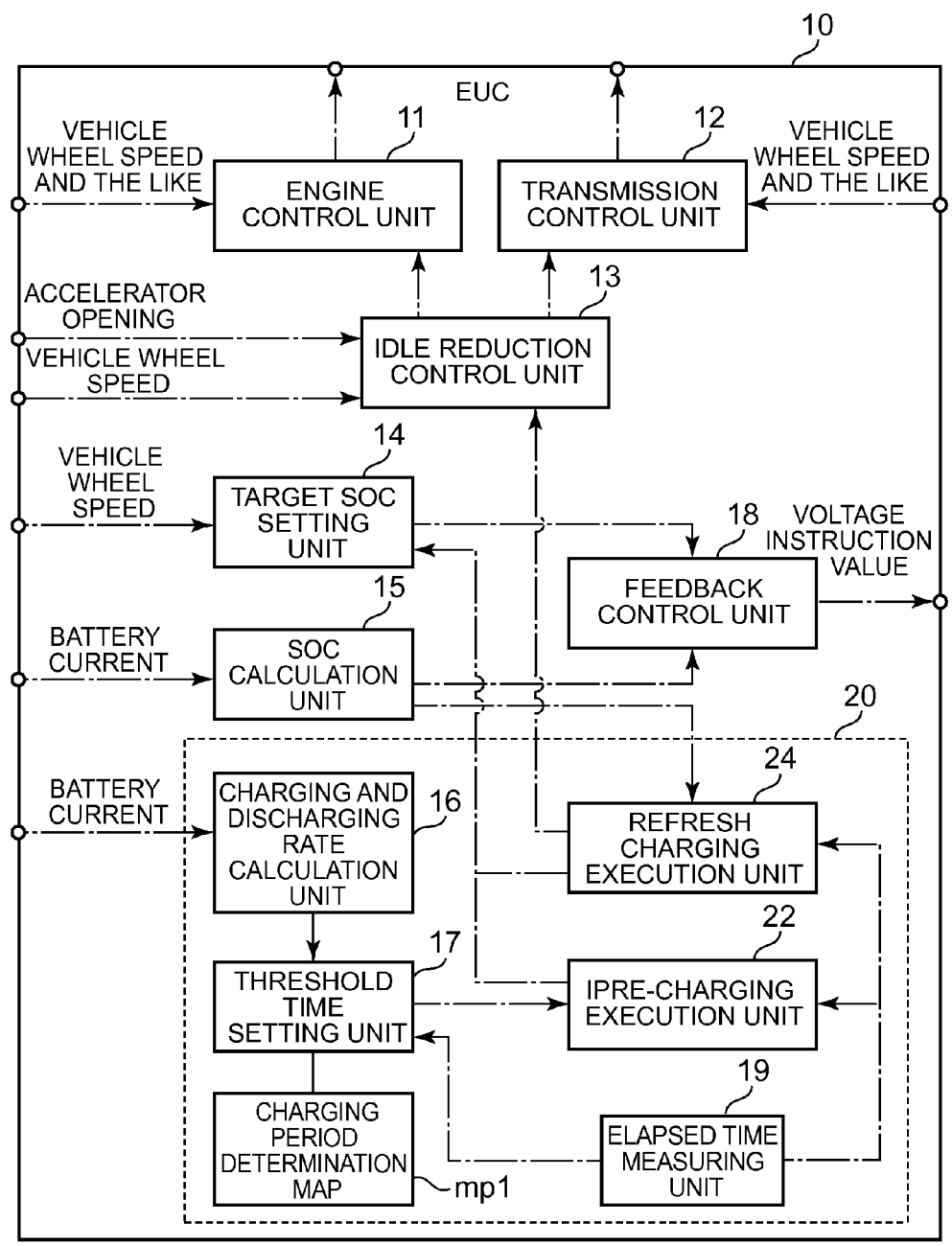
FIG. 2 is an explanatory drawing illustrating a detailed configuration of an electronic control unit of the first embodiment.

FIG. 2 is an explanatory drawing illustrating a detailed configuration of the electronic control unit 10 of the first embodiment. The electronic control unit 10 is configured to have, for example, a central processing unit (CPU) that executes a computer program, a read-only memory (ROM) that stores a computer program and the like, an application specific integrated circuit (ASIC) for a specific application, a random access memory (RAM) that temporarily stores data, and an I/O port that is connected to each of the sensors described above, an actuator (not illustrated), and the like.

The electronic control unit 10 that is illustrated in FIG. 2 executes control for driving or stopping an engine, gear shift ratio control, idle reduction control, control for charging the battery 30, and the like. In this embodiment, pre-charging, refresh charging, and normal charging are executed as charging processing for the battery 30. The pre-charging, the refresh charging, and the normal charging will be described in detail later.

As illustrated in FIG. 2, the electronic control unit 10 is provided with an engine control unit 11, a transmission control unit 12, an idle reduction control unit 13, a target SOC setting unit 14, an SOC calculation unit 15, a feedback control unit 18, and a charging control unit 20.

The engine control unit 11 controls the operation state of the engine 40 by adjusting the fuel injection amount, throttle opening, and the like based on the rotation speed of the drive wheels 65 that is detected by the vehicle speed sensor 61, the depression amount of the brake pedal that is detected by the brake pedal sensor 80, and the accelerator opening (depression amount of the accelerator pedal (not illustrated)) that is detected and notified by an accelerator opening sensor (not illustrated). In addition, the engine control unit 11 stops the engine 40 by stopping fuel injection into the engine 40 in response to a request from the idle reduction control unit 13 or restarts the engine 40 from a stop state by controlling the starter 42 in response to a request from the idle reduction control unit 13.

The transmission control unit 12 controls the gear shift ratio of the transmission 41 by controlling a hydraulic actuator (not illustrated) based on the rotation speed of the drive wheels 65 that is notified by the vehicle speed sensor 61, the accelerator opening that is notified by the accelerator opening sensor (not illustrated), and shift position information that is notified by a shift position sensor (not illustrated).

The idle reduction control unit 13, as the idle reduction control, acquires the vehicle wheel speed that is detected by the vehicle speed sensor 61 and the accelerator opening that is notified by the accelerator opening sensor (not illustrated) and outputs an instruction for stopping or starting the engine 40 to the engine control unit 11. More specifically, the idle reduction control unit 13 determines that an engine stop condition is satisfied and outputs the instruction for stopping the engine to the engine control unit 11 when the vehicle wheel speed is reduced and becomes less than a predetermined speed (for example, 10 km/h). The engine control unit 11 outputs the instruction for stopping the engine 40 to the starter 42. When the depression of the accelerator pedal is detected based on the accelerator opening thereafter, the idle reduction control unit 13 determines that an engine restart condition is satisfied and outputs the instruction for restarting the engine 40 to the engine control unit 11. The engine control unit 11 outputs the instruction for restarting the engine 40 to the starter 42. In other words, the idle reduction control unit 13 stops the engine 40 when the engine stop condition is satisfied and restarts the engine 40 when the engine restart condition is satisfied after the engine is stopped. The engine stop condition and the engine restart condition are not limited to the above description. For example, the engine stop condition may be the vehicle wheel speed reaching 0 km/h and the engine restart condition may be a foot taken off the brake pedal.

The target SOC setting unit 14 sets the state of charge (SOC) of the battery 30, which is a target in executing normal control (described later), the pre-charging, and the refresh charging. In this embodiment, the SOC means the value that is obtained by dividing the quantity of electricity remaining in the battery 30 by the quantity of electricity stored when the battery 30 is fully charged. The target SOC setting unit 14 predicts a traveling environment based on the vehicle wheel speed and sets the target SOC based on the predicted traveling environment. For example, the target SOC setting unit 14 estimates the traveling environment as an urban area or a suburban area based on the ratio of the vehicle-stopping time in a predetermined period. In a case where the traveling environment is the urban area, for example, the idle reduction control is executed and thus the consumption of the electric power of the battery 30 is likely to increase. Accordingly, the target SOC is set to a relatively high value in this case. As described later, the target SOC setting unit 14 receives an instruction from the charging control unit 20 during the pre-charging or the refresh charging and sets the target SOC based on the instruction.

The SOC calculation unit 15 calculates the current SOC based on the charging and discharging currents of the battery 30 that are detected by the battery current sensor 31. Specifically, the SOC calculation unit 15 calculates the current SOC by integrating the charging current with the discharging current with the charging current of the battery 30 having a positive value and the discharging current of the battery 30 having a negative value. The current SOC may be obtained based on the specific gravity of a battery electrolyte and a battery terminal voltage instead of the charging and discharging currents of the battery 30 that are detected by the battery current sensor 31.

The feedback control unit 18 obtains the difference between the target SOC that is set by the target SOC setting unit 14 and the current SOC that is calculated by the SOC calculation unit 15 and outputs a voltage value at which the difference is zero to the alternator 50 as a voltage instruction value. The alternator 50 that receives the voltage instruction value controls the output voltage so that the instructed voltage value is achieved when the voltage instruction value is received.

The charging control unit 20 controls the charging of the battery 30 and the discharging of the battery 30. The charging control unit 20 is provided with a charging and discharging rate calculation unit 16, a threshold time setting unit 17, a charging period determination map mp1, an elapsed time measuring unit 19, a pre-charging execution unit 22, and a refresh charging execution unit 24.

The charging and discharging rate calculation unit 16 calculates the charging and discharging rate based on the charging current and the discharging current of the battery 30 that are detected by the battery current sensor 31. In this embodiment, the charging and discharging rate means the ratio of the absolute value of the charging current integrated value to the absolute value of the discharging current integrated value.

During the charging control processing (described later), the threshold time setting unit 17 determines pre-charging initiation timing by using the charging period determination map mp1. In this embodiment, the pre-charging initiation timing is specified by the length of time from a moment at which the battery 30 is fully charged. The charging period determination map mp1 will be described in detail later. The elapsed time measuring unit 19 measures the length of time from the full charging of the battery 30.

The pre-charging execution unit 22 executes the pre-charging. In this embodiment, the pre-charging is processing for increasing the average SOC of the battery 30 to a predetermined value and is executed prior to the refresh charging as described later. During the pre-charging, the execution of the idle reduction control is allowed. In the vehicle, the period required for the refresh charging is shortened by the execution of the pre-charging.

The refresh charging execution unit 24 executes the refresh charging. In this embodiment, the refresh charging is processing for charging the battery 30 until the battery 30 is fully charged and is executed after the pre-charging. During the refresh charging, the execution of the idle reduction control is prohibited. In the system 100, the battery 30 is fully charged and reduction in the performance and service life of the battery 30 is suppressed by the execution of the refresh charging.

The charging control unit 20 has a functional unit (not illustrated) that executes the normal charging. In a case where a lead battery is used as the battery 30 as in this embodiment, the available SOC range is determined in advance allowing for demand for service life extension. Accordingly, the normal charging is executed so that the current SOC maintains the SOC range. Specifically, the power of the engine 40 is increased when the current SOC is below the lower limit (fixed value) of the SOC range and the electric power that is stored in the battery 30 is consumed when the current SOC exceeds the upper limit (target SOC) of the SOC range. In addition, processing for saving fuel consumption by suppressing the charging of the battery 30 by fuel electric power generation and performing the charging of the battery 30 by regenerative electric power generation in the alternator 50 during deceleration traveling is executed as the normal charging. This processing is known processing, and detailed description thereof will be omitted.

The charging control unit 20 described above corresponds to the charging control device in the claims.

In the vehicle on which the system 100 according to this embodiment is mounted, the battery 30 is fully charged by the execution of the charging control processing (described later). In the vehicle, extension of the period from the initiation of the pre-charging to the initiation of the refresh charging is suppressed by the execution of the threshold time adjustment processing (described later) and reduction in fuel economy attributable to the continuation of a high-SOC state over a long period of time can be suppressed by the execution of the threshold time adjustment processing (described later). Hereinafter, the charging control processing and the threshold time adjustment processing will be described in detail.

A2. Charging Control Processing

Figure 3:
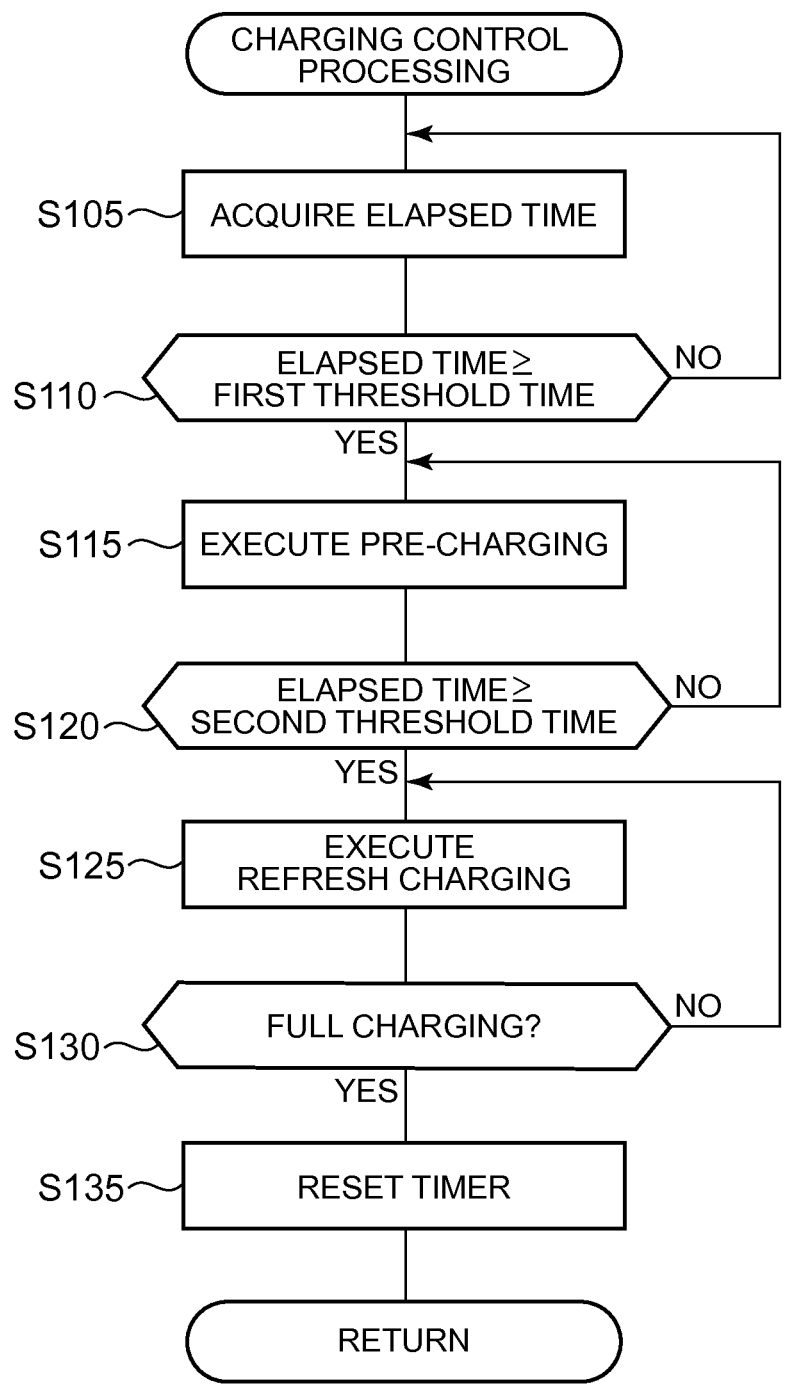
FIG. 3 is a flowchart illustrating the procedure of charging control processing according to the first embodiment.

FIG. 3 is a flowchart illustrating the procedure of the charging control processing according to the first embodiment. In the system 100, the charging control processing is initiated when an ignition switch (not illustrated) is turned ON and this processing is repeatedly executed until the ignition switch is turned OFF. The charging control processing is processing for fully charging the battery 30 on a regular basis.

The pre-charging execution unit 22 acquires the length of time from the full charging of the battery 30 (hereinafter, simply referred to as "elapsed time") from the elapsed time measuring unit 19 (Step S105). The pre-charging execution unit 22 determines whether or not the elapsed time acquired in Step S105 is equal to or longer than first threshold time (Step S110). The first threshold time is set by the execution of threshold adjustment processing (described later) by the threshold time setting unit 17. The threshold adjustment processing will be described in detail later. In a case where it is determined that the elapsed time is shorter than the first threshold time (that the elapsed time falls short of the first threshold time), Step S105 described above is executed.

In a case where it is determined that the elapsed time is equal to or longer than the first threshold time (Step S110: YES), the pre-charging execution unit 22 executes the pre-charging (Step S115). Specifically, the pre-charging execution unit 22 instructs the target SOC setting unit 14 to set a relatively high value (for example, 90%) close to full charging (100%) as the target SOC. The target SOC setting unit 14 sets the instructed value as the target SOC regardless, of the vehicle wheel speed. In a case where 90% is set as the target SOC and the target SOC is 80% before the elapsed time becomes equal to the first threshold time, for example, the target SOC is increased by 10%. As a result, the normal charging is executed so that the upper limit value of the current SOC becomes 90%, and the average SOC increases.

After the initiation of the pre-charging, the refresh charging execution unit 24 acquires the elapsed time from the elapsed time measuring unit 19 and determines whether or not the elapsed time is equal to or longer than a second threshold time (Step S120). The second threshold time is the time from the termination of the refresh charging to the initiation of the subsequent refresh charging and has a fixed value set in advance by a user.

Step S115 described above is executed in a case where it is determined that the elapsed time is shorter than the second threshold time (Step S120: NO) whereas the refresh charging execution unit 24 executes the refresh charging in a case where it is determined that the elapsed time is equal to or longer than the second threshold time (Step S120: YES). Specifically, the refresh charging execution unit 24 instructs the target SOC setting unit 14 to set 100% as the target SOC and instructs the idle reduction control unit 13 to prohibit the execution of the idle reduction control. This processing allows fuel electric power generation-based charging to be continuously executed without the engine 40 being stopped even in a case where the engine stop condition is satisfied.

After the initiation of the refresh charging, the refresh charging execution unit 24 acquires the current SOC from the SOC calculation unit 15 and determines whether or not the battery 30 is fully charged (Step S130). Step S125 described above is executed (refresh charging continues) in a case where it is determined that the battery 30 is not fully charged (Step S130: NO). In contrast, the refresh charging execution unit 24 terminates the refresh charging and the elapsed time measuring unit 19 resets the timer and initiates time measurement again (Step S135) in a case where it is determined that the battery 30 is fully charged (Step S130: YES).

A3. Threshold Time Adjustment Processing

Figure 4:
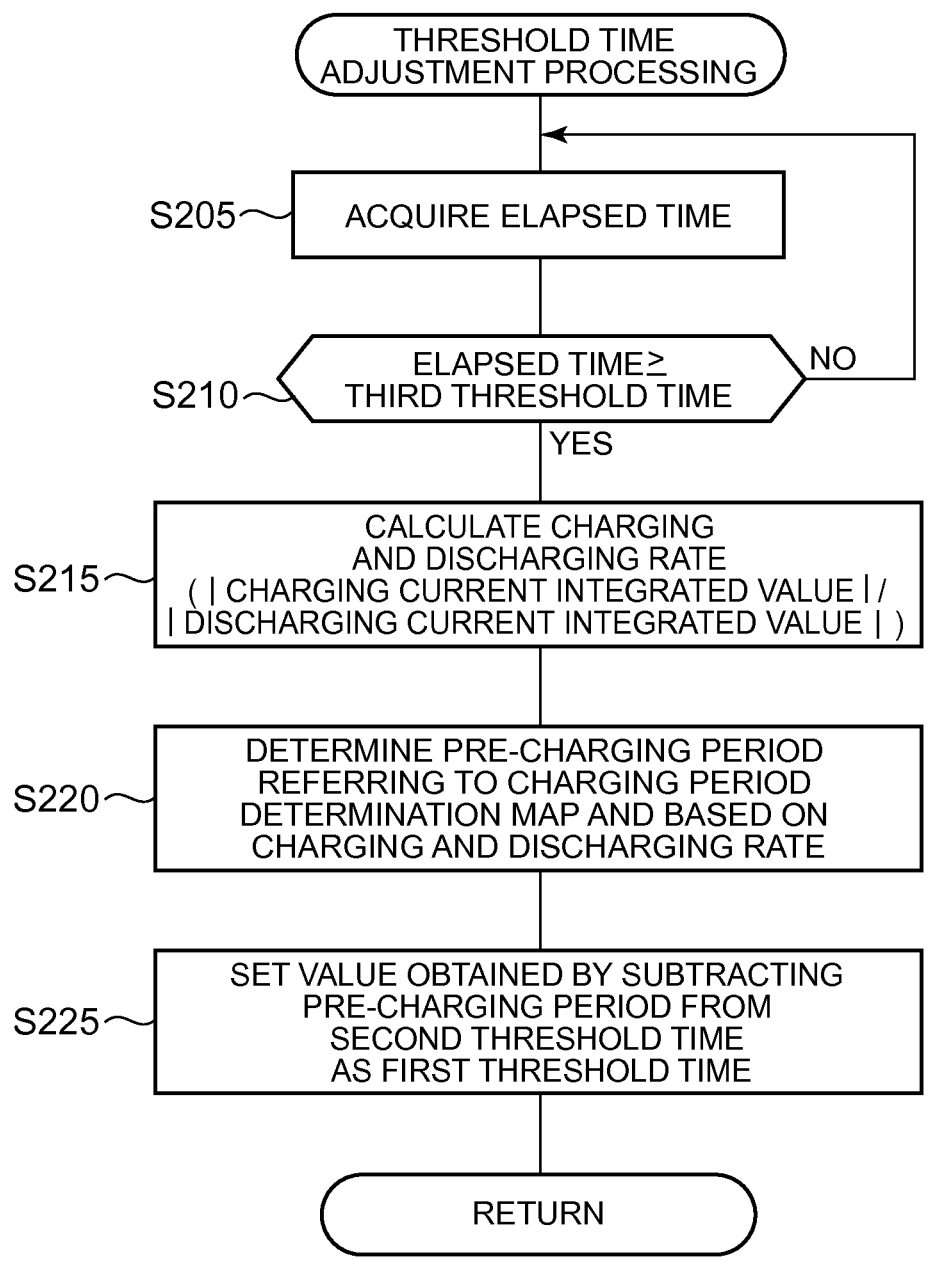
FIG. 4 is a flowchart illustrating the procedure of threshold time adjustment processing according to the first embodiment.

FIG. 4 is a flowchart illustrating the procedure of the threshold time adjustment processing according to the first embodiment. In the system 100, the threshold time adjustment processing is initiated when an ignition switch (not illustrated) is turned ON and this processing is repeatedly executed until the ignition switch is turned OFF. The threshold time adjustment processing is processing for adjusting the first threshold time described above.

The threshold time setting unit 17 acquires the elapsed time from the elapsed time measuring unit 19 (Step S205) and determines whether or not the elapsed time is equal to or longer than a third threshold time (Step S210). The third threshold time, which has a fixed value, is shorter than the second threshold time described above and is set in advance by the user. The length of time that is shorter by approximately 60 minutes than the second threshold time, for example, can be set as the third threshold time.

The charging and discharging rate calculation unit 16 calculates the charging and discharging rate (Step S215). The charging and discharging rate calculation unit 16 calculates the ratio of the absolute value of the charging current integrated value to the absolute value of the discharging current integrated value for the period that continues from ignition switch ON to the execution of Step S215.

The threshold time setting unit 17 determines the period of the execution of the pre-charging (Step S115 described above) referring to the charging period determination map mp1 and based on the charging and discharging rate calculated in Step S215 (Step S220).

Figure 5:
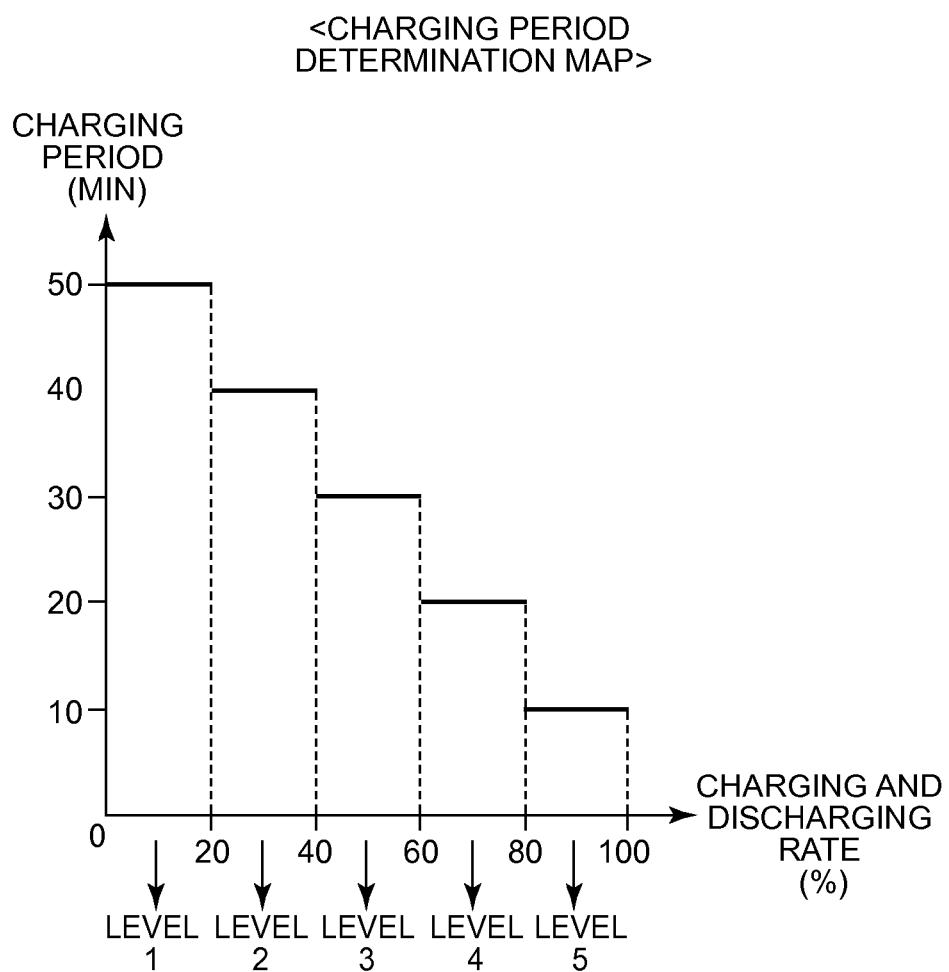
FIG. 5 is an explanatory drawing schematically illustrating the setting content of the charging period determination map that is illustrated in FIG. 2.

FIG. 5 is an explanatory drawing schematically illustrating the setting content of the charging period determination map mp1 that is illustrated in FIG. 2. The horizontal axis in FIG. 5 represents the charging and discharging rate and the vertical axis in FIG. 5 represents the charging period. As illustrated in FIG. 5, the charging and discharging rate is distinguished into five levels in the charging period determination map mp1 and the same different charging period is set in each level. In addition, a shorter charging period is set for a higher charging and discharging rate level in the charging period determination map mp1. Specifically, 50 minutes is set as the charging period for Level 1 where the charging and discharging rate is 0% to 20%. In addition, 40 minutes is set as the charging period for Level 2 where the charging and discharging rate exceeds 20% and is equal to or less than 40%. 30 minutes is set as the charging period for Level 3 where the charging and discharging rate exceeds 40% and is equal to or less than 60%. 20 minutes is set as the charging period for Level 4 where the charging and discharging rate exceeds 60% and is equal to or less than 80%. 10 minutes is set as the charging period for Level 5 where the charging and discharging rate exceeds 80% and is equal to or less than 100%. Accordingly, a shorter charging period is set for a higher charging and discharging rate level as illustrated in FIG. 5.

Figure 6:
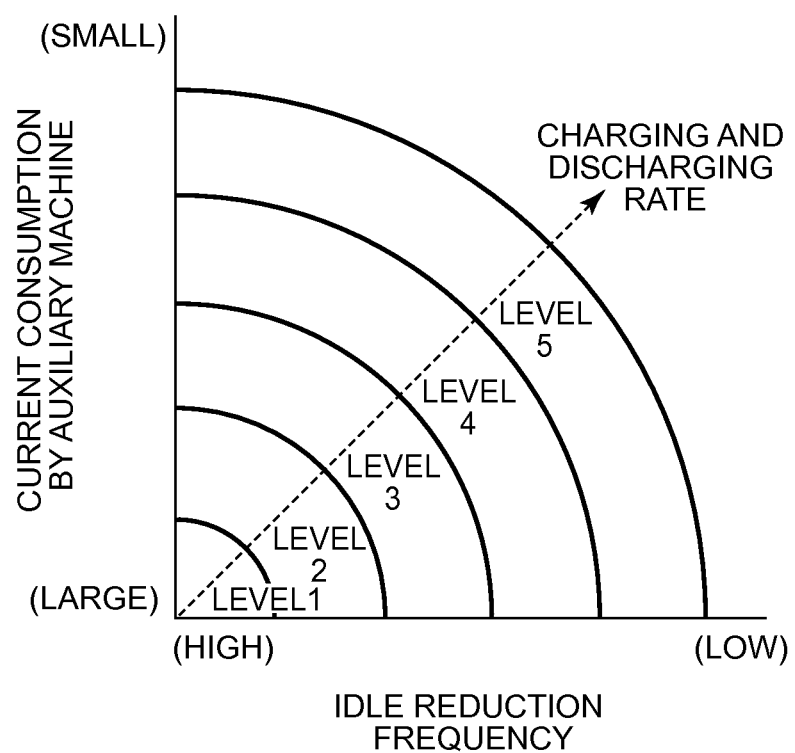
FIG. 6 is an explanatory drawing illustrating a relationship between a charging and discharging rate and idle reduction frequency and a relationship between the charging and discharging rate and a current consumption value of an auxiliary machine.

FIG. 6 is an explanatory drawing illustrating a relationship between the charging and discharging rate and idle reduction frequency and a relationship between the charging and discharging rate and a current consumption value of the auxiliary machine. The horizontal axis in FIG. 6 represents the idle reduction frequency. In this embodiment, the idle reduction frequency means the ratio of an idle reduction control execution period to a predetermined period. On the horizontal axis in FIG. 6, the idle reduction frequency decreases from the left side to the right side. The vertical axis in FIG. 6 represents the current consumption value of the auxiliary machine 70. On the vertical axis in FIG. 6, the current consumption value decreases from the bottom to the top.

As illustrated in FIG. 6, the lower the idling stop frequency, the higher the charging and discharging rate. When the idle reduction control is executed, the driving of the engine 40 is stopped, and thus the charging current decreases. Accordingly, when the idling stop frequency decreases, the frequency of charging current decrease decreases and the charging and discharging rate increases. As illustrated in FIG. 6, the less the current consumption by the auxiliary machine 70, the higher the charging and discharging rate. When the current consumption by the auxiliary machine 70 is large, the discharging current increases. Accordingly, when the current consumption by the auxiliary machine 70 decreases, the discharging current decreases and the charging and discharging rate increases. A shorter period is set as the pre-charging period as the idling stop frequency decreases and a shorter period is set as the pre-charging period as the current consumption by the auxiliary machine 70 decreases from the relationship between the charging and discharging rate and the idle reduction frequency and the relationship between the charging and discharging rate and the current consumption value of the auxiliary machine described above.

As illustrated in FIG. 4, the threshold time setting unit 17 sets the value (time) that is obtained by subtracting the charging period obtained in Step S220 from the second threshold time described above as the first threshold time (Step S225) after the determination of the charging period (after the execution of Step S220). As described above, the charging period is set to a shorter period of time as the charging and discharging rate increases, and thus a longer period of time is set as the first threshold time. Accordingly, the pre-charging (Step S115) is initiated after the elapse of a longer period from the full charging of the battery 30 as the charging and discharging rate is higher.

FIG. 7 is a timing chart illustrating how the SOC changes in a case where the charging control processing and the threshold time adjustment processing according to the first embodiment are executed. FIG. 7(a) represents a timing chart for a case where the charging and discharging rate is relatively low. FIG. 7(b) represents a timing chart for a case where the charging and discharging rate is relatively high. The horizontal axes in FIG. 7(a) and FIG. 7(b) represent time (elapsed time from a moment at which the battery 30 is fully charged) and the vertical axes in FIG. 7(a) and FIG. 7(b) represent the SOC. The solid lines in FIG. 7(a) and FIG. 7(b) shows how the SOC changes in a case where the charging control processing and the threshold time adjustment processing according to this embodiment are executed and the dashed lines in FIG. 7(a) and FIG. 7(b) show how the SOC of a comparative example changes. In the comparative example, the pre-charging is not executed, and the refresh charging is performed in a case where the elapsed time becomes equal to predetermined time.

In this embodiment, the pre-charging is performed before the execution of the refresh charging and the average SOC is increased to S2 from S1 of the normal control as illustrated in FIG. 7(a). Accordingly, the execution of the refresh charging thereafter allows the period (period from time T2 to T3) required for a change in the average SOC from S2 to Sf (full charging) to be shortened compared to the period (period from time T2 to T4) required for the refresh charging in the comparative example.

Even in a case where the charging and discharging rate is relatively high, the refresh charging period can be shortened, as illustrated in FIG. 7(b), compared to that of the comparative example as in a case where the charging and discharging rate is relatively low. In addition, the pre-charging period (T2−T1) for a case where the charging and discharging rate is relatively high is shorter than the pre-charging period (T2−T0) for a case where the charging and discharging rate is relatively low. Accordingly, the period during which a state where the average SOC has a relatively high value (S2) continues can be shortened, and thus a large capacity can be ensured to be capable of accepting the electric power generated by the fuel electric power generation in the battery 30. Accordingly, fuel economy can be improved.

As described above, the charging control unit 20 according to the first embodiment sets the first threshold time so that the pre-charging period becomes shorter as the charging and discharging rate increases, and thus the period during which a state where the SOC of the battery 30 is relatively high continues can be shortened in a case where the charging and discharging rate is high. Accordingly, a large capacity can be ensured to be capable of accepting the electric power generated by the fuel electric power generation in the battery 30 and fuel economy can be improved compared to a configuration in which the pre-charging period is constant regardless of the charging and discharging rate. In addition, since the pre-charging initiation timing and refresh charging initiation timing are determined based on the elapsed time from the full charging of the battery 30, the battery 30 can be fully charged at appropriate timing in accordance with the state of deterioration of the battery 30. In addition, since the pre-charging is performed prior to the refresh charging and the average SOC of the battery 30 is increased in advance, the period required for the refresh charging can be shortened. Accordingly, a period during which the idle reduction control is prohibited as a result of the execution of the refresh charging can be shortened and fuel economy can be improved.

B. Second Embodiment

Figure 8:
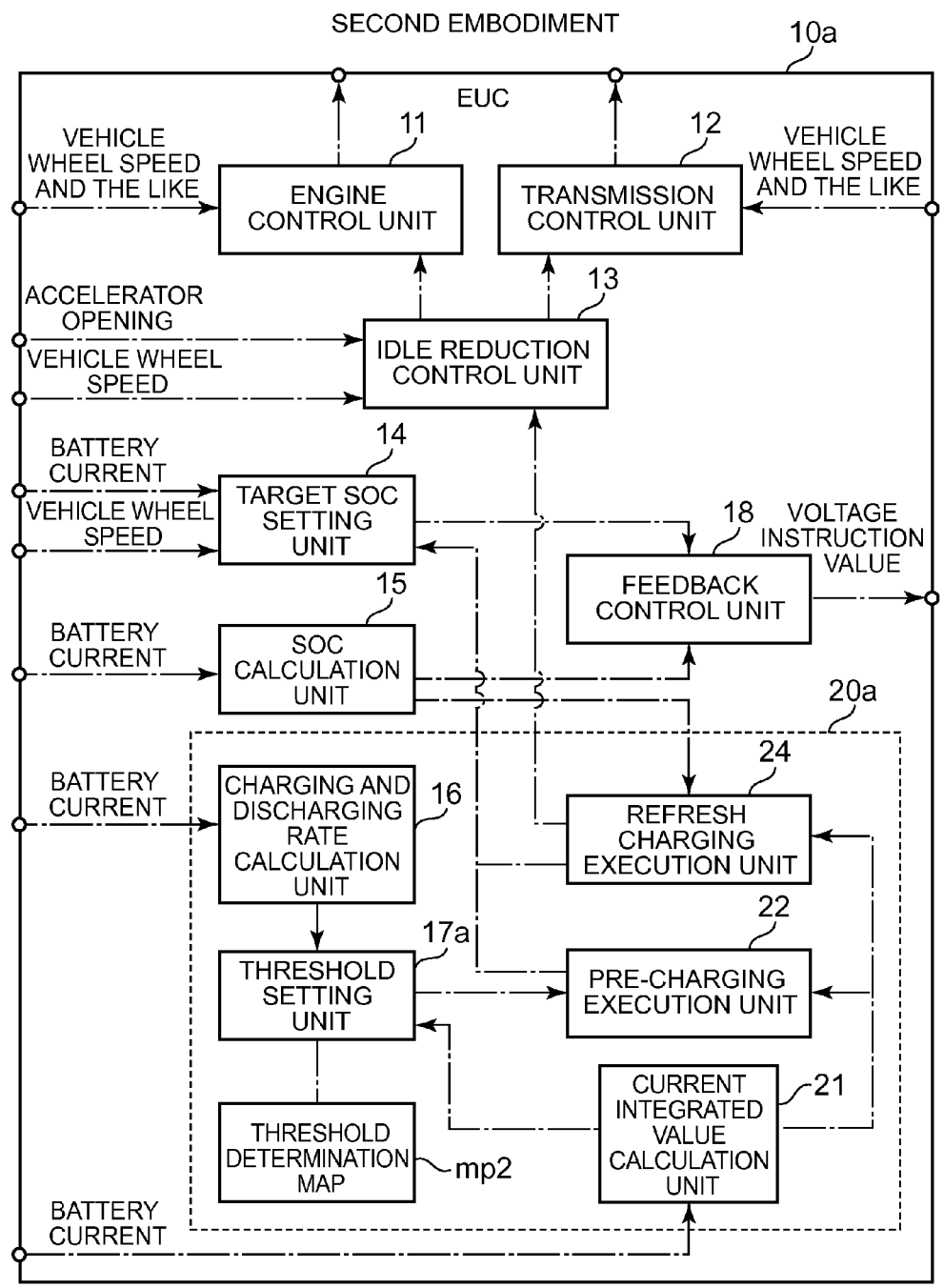
FIG. 8 is an explanatory drawing illustrating a detailed configuration of an electronic control unit of a second embodiment.
Figure 9:
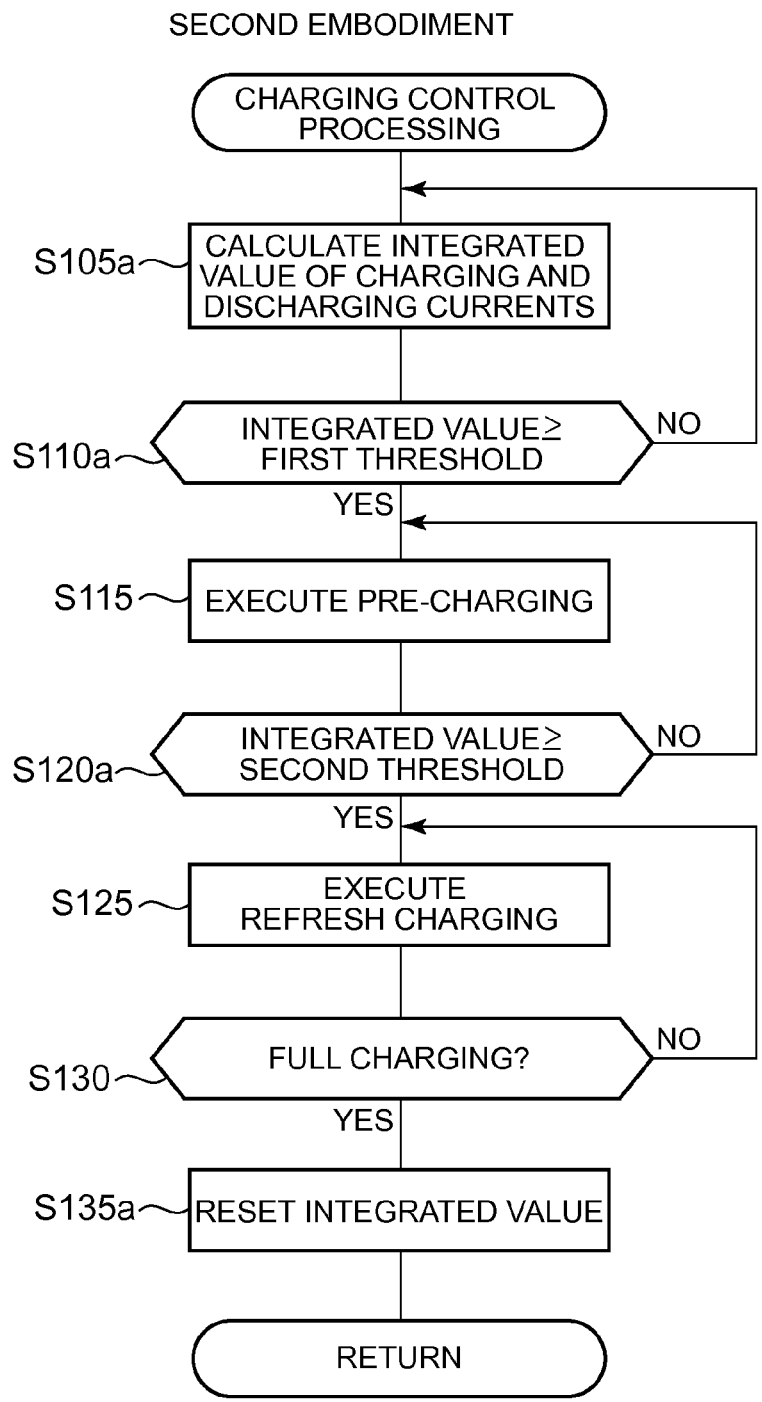
FIG. 9 is a flowchart illustrating the procedure of charging control processing according to the second embodiment.
Figure 10:
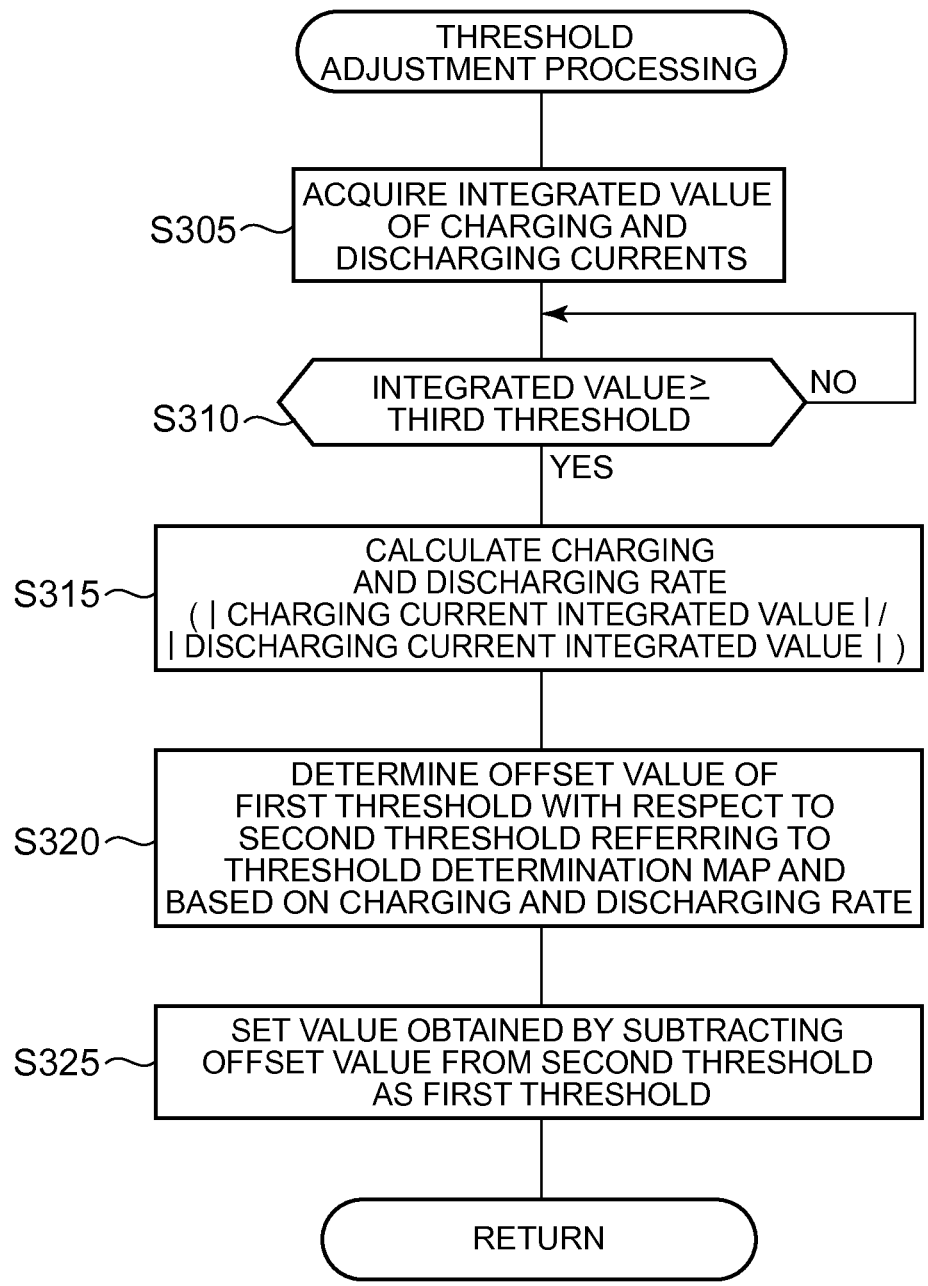
FIG. 10 is a flowchart illustrating the procedure of threshold adjustment processing according to the second embodiment.

FIG. 8 is an explanatory drawing illustrating a detailed configuration of an electronic control unit 10a of a second embodiment. FIG. 9 is a flowchart illustrating the procedure of charging control processing according to the second embodiment. FIG. 10 is a flowchart illustrating the procedure of threshold adjustment processing according to the second embodiment.

The electronic control unit 10a according to the second embodiment differs from the electronic control unit 10 according to the first embodiment in that a charging control unit 20a is provided instead of the charging control unit 20 and threshold adjustment processing is executed instead of the threshold time adjustment processing. The electronic control unit 10a according to the second embodiment differs from the electronic control unit 10 according to the first embodiment in the detailed procedure of the charging control processing as well. The electronic control unit 10a according to the second embodiment is identical to the electronic control unit 10 according to the first embodiment regarding the rest of the configuration. In the system 100 according to the first embodiment described above, the chances of the initiation of the pre-charging and the refresh charging is determined based on the elapsed time from the full charging of the battery 30. In contrast, in the system 100 according to the second embodiment, these chances are determined based on the integrated value of the charging and discharging currents of the battery.

As illustrated in FIG. 8, the charging control unit 20a according to the second embodiment differs from the charging control unit 20 according to the first embodiment in that a threshold setting unit 17a is provided instead of the threshold time setting unit 17, a threshold determination map mp2 is provided instead of the charging period determination map mp1, and a current integrated value calculation unit 21 is provided instead of the elapsed time measuring unit 19. The charging control unit 20a according to the second embodiment is identical to the charging control unit 20 according to the first embodiment regarding the rest of the configuration.

The threshold setting unit 17a executes the threshold adjustment processing (described later). The current integrated value calculation unit 21 calculates the integrated value of the charging and discharging currents. The integrated value of the charging and discharging currents and the threshold determination map mp2 will be described in detail later.

The charging control processing according to the second embodiment that is illustrated in FIG. 9 differs from the charging control processing according to the first embodiment that is illustrated in FIG. 3 in that Step S105a is executed instead of Step S105, Step S110a is executed instead of Step S110, Step S120a is executed instead of Step S120, and Step S135a is executed instead of Step S135. The charging control processing according to the second embodiment that is illustrated in FIG. 9 is identical to the charging control processing according to the first embodiment regarding the rest of the processing.

The current integrated value calculation unit 21 calculates the integrated value of the charging and discharging currents (Step S105a). In the second embodiment, the integrated value of the charging and discharging currents means the sum of the absolute value of the discharging current integrated value and the absolute value of the charging current integrated value after the full charging of the battery 30.

The threshold setting unit 17a determines whether or not the integrated value of the charging and discharging currents that is calculated in Step S105a is equal to or greater than a first threshold (Step S110a). Step S105a described above is executed in a case where it is determined that the integrated value of the charging and discharging currents is less than the first threshold (Step S110a: NO). Step S115 (pre-charging) described above is executed in a case where it is determined that the integrated value of the charging and discharging currents is equal to or greater than the first threshold (Step S110a: YES). The first threshold is determined by the threshold adjustment processing (described later).

After the initiation of the pre-charging, the refresh charging execution unit 24 acquires the integrated value of the charging and discharging currents from the current integrated value calculation unit 21 and determines whether or not the integrated value of the charging and discharging currents is equal to or greater than a second threshold (Step S120a). The second threshold, which has a fixed value, is set in advanced by the user as the integrated value of the charging and discharging currents for the time from the termination of the refresh charging to the initiation of the subsequent refresh charging. In general, the chance of the charging or the discharging of the battery 30 increases as the length of time elapsed from the fully charged state increases, and thus the integrated value of the charging and discharging currents increases. In other words, the time elapsed from the fully charged state and the integrated value of the charging and discharging currents are proportional to each other. Accordingly, in a case where a greater value is set as the second threshold, the refresh charging is executed at a longer time interval.

Step S115 described above is executed (continues) in a case where the integrated value of the charging and discharging currents is less than the second threshold (Step S120a: NO) and Step S125 (refresh charging) described above and Step S130 are executed in a case where the integrated value of the charging and discharging currents is equal to or greater than the second threshold. In a case where it is determined in Step S130 that the battery 30 is fully charged (Step S130: YES), the current integrated value calculation unit 21 resets the calculated integrated value of the charging and discharging currents (Step S135).

FIG. 10 is a flowchart illustrating the procedure of the threshold adjustment processing according to the second embodiment. In the system 100, the threshold adjustment processing is initiated when an ignition switch (not illustrated) is turned ON and this processing is repeatedly executed until the ignition switch is turned OFF. The threshold adjustment processing is processing for adjusting the first threshold described above.

The threshold setting unit 17a acquires the integrated value of the charging and discharging currents from the current integrated value calculation unit 21 (Step S305) and determines whether or not the value is equal to or greater than a third threshold (Step S310). The third threshold, which has a fixed value, is less than the second threshold described above and is set in advance by the user. The value that is smaller by 60,000 Ampere seconds (As) than the second threshold, for example, can be set as the third threshold.

Step S305 described above is executed in a case where it is determined that the integrated value of the charging and discharging currents is less than the third threshold (Step S310: NO) whereas the charging and discharging rate calculation unit 16 calculates the charging and discharging rate (Step S315) in a case where it is determined that the integrated value of the charging and discharging currents is equal to or greater than the third threshold (Step S310: YES). This processing is identical to Step S215 in FIG. 4. Description thereof will be omitted.

The threshold setting unit 17a determines an offset value (Step S320) of the first threshold (integrated value of the charging and discharging currents at the initiation of the pre-charging) with respect to the second threshold (integrated value of the charging and discharging currents at the initiation of the refresh charging) referring to the threshold determination map mp2 and based on the charging and discharging rate calculated in Step S315.

FIG. 11 is an explanatory drawing schematically illustrating the setting content of the threshold determination map mp2 that is illustrated in FIG. 8. The horizontal axis in FIG. 11 represents the charging and discharging rate and the vertical axis in FIG. 11 represents the offset value (current integrated value) of the first threshold with respect to the second threshold. As illustrated in FIG. 11, the charging and discharging rate is distinguished into five levels in the threshold determination map mp2 as in the charging period determination map mp1 illustrated in FIG. 5. The different offset value is set in each level in the threshold determination map mp2. Specifically, 50,000 As is set as the offset value for Level 1 where the charging and discharging rate is 0% to 20%. In addition, 40,000 As is set as the offset value for Level 2 where the charging and discharging rate exceeds 20% and is equal to or less than 40%. 30,000 As is set as the offset value for Level 3 where the charging and discharging rate exceeds 40% and is equal to or less than 60%. 20,000 As is set as the offset value for Level 4 where the charging and discharging rate exceeds 60% and is equal to or less than 80%. 10,000 As is set as the offset period for Level 5 where the charging and discharging rate exceeds 80% and is equal to or less than 100%. Accordingly, a smaller offset value is set for a higher charging and discharging rate level as illustrated in FIG. 11.

As described with reference to FIG. 6, the charging and discharging rate increases as the idling stop frequency decreases and the current consumption by the auxiliary machine 70 decreases. Accordingly, in the second embodiment, a smaller value is set as the offset value as the idling stop frequency decreases and the current consumption by the auxiliary machine 70 decreases.

As illustrated in FIG. 10, the threshold setting unit 17a sets the value that is obtained by subtracting the offset value obtained in Step S320 from the second threshold described above as the first threshold (Step S325) after a charging capacity determination (after the execution of Step S320). Since the offset value is set to a smaller value as the charging and discharging rate increases as described above, a higher value is set as the first threshold. The elapsed time and the integrated value of the charging and discharging currents are proportional to each other as described above. Accordingly, the pre-charging (Step S115) is initiated after the elapse of a longer period from the full charging of the battery 30 as the charging and discharging rate is higher.

The charging control unit 20a according to the second embodiment described above has effects similar to those of the charging control unit 20 according to the first embodiment. In the second embodiment, a higher value is set as the first threshold in a case where the charging and discharging rate is higher, and a fixed value is set as the second threshold. Since the elapsed time and the integrated value of the charging and discharging currents are proportional to each other herein, the pre-charging period can be shortened in a case where the charging and discharging rate is high. Since the pre-charging initiation timing and the refresh charging initiation timing are determined based on the integrated value of the charging and discharging currents, the battery 30 can be fully charged at appropriate timing in accordance with the state of deterioration of the battery 30.

C. Modification Example

C1. First Modification Example

Each of the embodiments adopts the method of setting of the target SOC (upper limit value of the SOC range) to a high predetermined value regardless of the vehicle wheel speed as a method for increasing the average SOC during the pre-charging and the refresh charging. However, the invention is not limited thereto. For example, the method of increasing the charging amount per unit time by controlling the alternator 50 and increasing the voltage during charging may be adopted. For example, the method of prohibiting the suppression of the charging of the battery 30 in a case where the current SOC exceeds the target SOC may be adopted. In general, any processing allowing the average SOC of the battery 30 to increase can be adopted as the pre-charging according to the invention. In this embodiment, the SOC represents the value that is obtained by dividing the quantity of electricity remaining in the battery 30 by the quantity of electricity stored when the battery 30 is fully charged (maximum storage capacity). Herein, the period during which the pre-charging is executed is sufficiently shorter than the period during which the pre-charging is not executed, and thus the maximum storage capacity does not significantly decrease in the period. Accordingly, an increase in the average SOC based on the pre-charging means an increase in the average remaining capacity of the battery 30 based on the pre-charging. Accordingly, any processing allowing the average remaining capacity of the battery 30 to increase can be adopted as the pre-charging according to the invention.

C2. Second Modification Example

In the first embodiment, the charging and discharging rate is distinguished into five levels in the charging period determination map mp1 and the different charging period is set in each level. However, the invention is not limited thereto. For example, the levels may be omitted and an electric power receiving period may be set to monotonically decrease as the charging and discharging rate increases. Likewise, the levels may be omitted and an offset value may be set to monotonically decrease as the charging and discharging rate increases in the threshold determination map mp2 according to the second embodiment.

C3. Third Modification Example

In the second embodiment, the first threshold is determined by subtracting the offset value from the second threshold after the determination of the offset value with respect to the second threshold. However, the invention is not limited thereto. For example, a map in which not the offset value but the first threshold is explicitly associated with the charging and discharging rate may be used as the threshold determination map mp2 and the first threshold may be determined referring to this map and based on the charging and discharging rate.

C4. Fourth Modification Example

In each of the embodiments, the vehicle is a car. However, the invention is not limited thereto. The invention can also be applied to any vehicle such as two-wheeled vehicles. In addition, the invention can be applied to various types of moving bodies such as ships and robots as well as vehicles and can be applied to, for example, electric power generation systems in which batteries and engines are used as stationary electric power supplies. In general, the invention can be applied to any device that is used in a system which has an engine, an electric power generator driven by the engine, and a battery charged by the electric power generated by the electric power generator and is capable of executing stop control for prohibiting the engine from starting in a state where the engine is stopped and controls the charging of the battery. The "state where the engine is stopped" described above is not limited to a state where the engine is completely stopped but has a broad meaning covering, for example, a state of the engine where the speed at which the vehicle moves becomes equal to or less than a predetermined speed (for example, 10 km/h).

C5. Fifth Modification Example

In the example described above, part of the configuration realized by software can be replaced by using hardware. Part of the configuration realized by hardware can be replaced by using software as well.

The invention is not limited to the embodiments, examples, and modification examples described above. The invention can be realized in various configurations without departing from the scope of the invention. For example, the embodiments corresponding to the technical features pertaining to the respective aspects in the SUMMARY OF THE INVENTION and the technical features in the modification examples can be appropriately replaced or combined so as to address some or all of the problems described above or achieve some or all of the effects described above. The technical features can be appropriately removed unless described as essential in this specification.

REFERENCE SIGNS LIST 10, 10a Electronic control unit
11 Engine control unit
12 Transmission control unit
13 Idle reduction control unit
14 Target SOC setting unit
15 SOC calculation unit
16 Charging and discharging rate calculation unit
17 Threshold time setting unit
17a Threshold setting unit
18 Feedback control unit
19 Elapsed time measuring unit
20, 20a Charging control unit
21 Current integrated value calculation unit
22 Pre-charging execution unit
24 Refresh charging execution unit
30 Battery
31 Battery current sensor
40 Engine
41 Transmission
42 Starter
43 Drive mechanism
50 Alternator
51 Alternator current sensor
60 Differential gear
61 Vehicle speed sensor
65 Drive wheel
70 Auxiliary machine 80 Brake pedal sensor
100 System
mp1 Charging period determination map
mp2 Threshold determination map

The invention claimed is:

1. A charging control device used in a system having an engine, an electric power generator driven by the engine, and a battery charged by electric power generated by the electric power generator and the system being capable of executing stop control for prohibiting the engine from restarting in a state where the engine is stopped and the charging control device controlling the charging of the battery, the charging control device comprising:
a charging and discharging rate calculation unit calculating a charging and discharging rate, the charging and discharging rate being a ratio of an absolute value of a charging current integrated value of the battery to an absolute value of a discharging current integrated value of the battery following a full charging of the battery;
a pre-charging execution unit executing pre-charging for increasing an average remaining capacity of the battery, the pre-charging execution unit shortening a period during which the pre-charging is executed when the calculated charging and discharging rate is high; and
a refresh charging execution unit executing refresh charging for charging the battery by the electric power generated by the electric power generator, without executing the stop control, after the execution of the pre-charging and allowing the battery to be fully charged.

2. The charging control device according to claim 1, further comprising:
an elapsed time measuring unit measuring the time elapsed from the full charging of the battery by the refresh charging,
wherein the refresh charging execution unit executes the refresh charging in a case where the elapsed time becomes equal to a predetermined second threshold time, and
wherein the pre-charging execution unit delays the time at which the pre-charging is initiated, compared to a case where the calculated charging and discharging rate is low, when the calculated charging and discharging rate is high after the full charging of the battery by the refresh charging.

3. The charging control device according to claim 2, further comprising:
a threshold setting unit,
wherein the pre-charging execution unit executes the pre-charging in a case where the elapsed time becomes equal to a first threshold time shorter than the second threshold time, and
wherein the threshold setting unit sets the first threshold time to a long value, compared to a case where the calculated charging and discharging rate is low, when the calculated charging and discharging rate is high.

4. The charging control device according to claim 1, further comprising:
a current integrated value calculation unit obtaining a total current integrated value of the absolute value of the charging current integrated value and the absolute value of the discharging current integrated value following the full charging of the battery by the refresh charging; and
a threshold setting unit,
wherein the refresh charging execution unit executes the refresh charging in a case where the total current integrated value becomes equal to a predetermined second threshold integrated value,
wherein the pre-charging execution unit executes the pre-charging in a case where the total current integrated value becomes equal to a first threshold integrated value less than the second threshold integrated value, and
wherein the threshold setting unit sets the first threshold integrated value to a high value, compared to a case where the calculated charging and discharging rate is low, when the calculated charging and discharging rate is high.

5. The charging control device according to claim 1,
wherein the system is mounted on a vehicle using the engine as a power source,
wherein the stop control is idle reduction control, and
wherein the state where the engine is stopped is a state where a speed at which the vehicle moves is equal to or less than a predetermined speed.

6. A charging control method for a system having an engine, an electric power generator driven by the engine, and a battery charged by electric power generated by the electric power generator and the system being capable of executing stop control for prohibiting the engine from restarting in a state where the engine is stopped, the charging control method being for controlling the charging of the battery, and the charging control method comprising:
calculating a charging and discharging rate, using an electronic control unit, the charging and discharging rate being a ratio of an absolute value of a charging current integrated value of the battery to an absolute value of a discharging current integrated value of the battery following a full charging of the battery;
executing, using the electronic control unit, pre-charging for increasing an average remaining capacity of the battery and shortening a period during which the pre-charging is executed when the calculated charging and discharging rate is high; and
executing, using the electronic control unit, refresh charging for charging the battery by the electric power generated by the electric power generator, without executing the stop control, after the execution of the pre-charging and allowing the battery to be fully charged.

7. A computer-readable non-transitory recording medium where a program is recorded, the program being used in a system having an engine, an electric power generator driven by the engine, and a battery charged by electric power generated by the electric power generator and the system being capable of executing stop control for prohibiting the engine from restarting in a state where the engine is stopped, so as to control the charging of the battery, the program causing a computer to realize:
a function of calculating a charging and discharging rate, the charging and discharging rate being a ratio of an absolute value of a charging current integrated value of the battery to an absolute value of a discharging current integrated value of the battery following a full charging of the battery;
a function of executing pre-charging for increasing an average remaining capacity of the battery and shortening a period during which the pre-charging is executed when the calculated charging and discharging rate is high; and
a function of executing refresh charging for charging the battery by the electric power generated by the electric power generator, without executing the stop control, after the execution of the pre-charging and allowing the battery to be fully charged.

* * * * *